Jan. 27, 1970    B. D. BAXTER    3,491,854
SLIDE FASTENER LUBRICATOR
Filed March 27, 1967

INVENTOR.
BENJAMIN D. BAXTER

# United States Patent Office 3,491,854
Patented Jan. 27, 1970

3,491,854
SLIDE FASTENER LUBRICATOR
Benjamin D. Baxter, 7815 4th Ave.,
Brooklyn, N.Y. 11209
Filed Mar. 27, 1967, Ser. No. 626,152
Int. Cl. F01m 1/00, 9/12; A45d 40/20
U.S. Cl. 184—1                                    8 Claims

ABSTRACT OF THE DISCLOSURE

A hand held lubricator for slide type fasteners comprises opposed disc portions having curved peripheral flanges spaced to receive a slide fastener between them and a body of solid wax-type lubricant fixedly held between the disc portions and having a curved peripheral surface positioned inwardly from the peripheral edges of the disc portions. The two disc portions are connected by a portion extending through the interposed solid lubricant to secure it in place. Inner surfaces of the peripheral flanges of the disc portions converge inwardly to guide the fastener elements to the solid lubricant while keeping adjacent portions of fabric to which the fasteners are attached out of contact with the lubricant as the lubricator is slid along a fastener to lubricate it.

---

This invention relates to a simple lubricating device which is especially adapted for use in lubricating "zippers" or similar slide type fasteners.

Garments provided with slide fasteners, when sent to the cleaners, are subjected to strong cleansing chemicals that remove all lubricant from the fasteners frequently causing them to get stuck, or snag, and fail to open or close properly. Lubricating the slide fastener at such times will improve its functioning and prolong its life. Previous lubricating devices for slide fasteners have had moving parts which require more skill to use, with possibility of injury to the users fingers, and are also more expensive to manufacture.

The slide fastener lubricator of this invention offers the following important features:

(1) It comprises a simple housing unit containing a solid lubricant between spaced supporting flanged structures.

(2) The housing unit, in an edge view, has extended dual flanges, one on each side, allowing for a spaced opening between the flanges, which extends around the edged surface of a circular peripheral portion of the housing body. The flanges have a threefold purpose:

(a) They form a supporting housing structure for the solid lubricant.

(b) They guide the fastener elements smoothly into the lubricant.

(c) They protect the garment from being smeared or smudged.

(3) The unit is designed so that it can be carried on the person, for example on a key chain, without smearing, staining, or running onto other objects within the content of the pocket or on the garment itself.

(4) There are no moving parts: nothing to wear out except the lubricant itself.

(5) Because of its simple construction it is easy to use, requiring no technical ingenuity or skill.

(6) It can be used by holding it in one hand, between the index finger and thumb, and gliding it over the fastener to imart the lubricant to the fastener elements.

(7) Any portion of the lubricant around the circular housing can be used. When the lubricant is completely used up, the unit is then discarded.

(8) The housing body can be composed of plastic, metal, cardboard, or other suitable material.

The invention may be more readily comprehended by reference to the accompanying drawings which illustrate preferred embodiments and in which.

Similar reference characters are used to designate the same or functionally similar parts through the several views.

Figure 1:
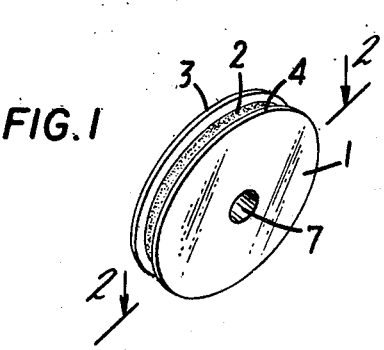
FIG. 1 is a perspective view illustrating a preferred embodiment of the invention.
Figure 2:
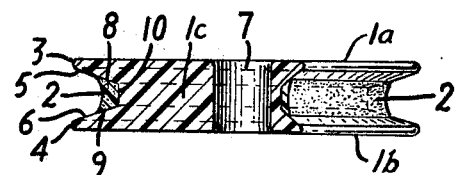
FIG. 2 is an edge view, partially in section, taken approximately along the lines 2—2 in FIG. 1.

In FIGS. 1 and 2 there is shown a preferred embodiment of my invention comprising a main body or housing 1 and a ring of lubricant 2. The main body is formed as a one piece structure made from plastic or other suitable material and comprises opposed disc portions 1a and 1b and a central connecting portion 1c. At the outer peripheral edges of the disc portions 1a and 1b lateral flanges 3 and 4, formed integrally with and protruding peripherally from the disc portions. A peripheral groove is thus formed, bordered laterally by the inner bevelled edges 5 and 6 of the flanges 3 and 4, and at the base by the peripheral edge 10 of the connecting portion 1c of the body 1. The bevelled edges 5 and 6 act as guide edges which direct the slide fastener toward the lubricant disposed in the peripheral groove. At the center of the circular body 1, a hole 7 permits the unit to be hung on a nail when not in use, or carried on a key chain if desired.

The solid lubricating ring 2 consists of a ringe of paraffin wax or other suitable substance for this purpose, which is capable of withstanding temperature of at least 200° F. heat without melting. This lubricant is embedded in the grooved housing represented by inner portions 8 and 9 of bevelled edges 5 and 6, and by peripheral edge 10 which extends all around the circular edge of the housing body 1.

Figure 3:
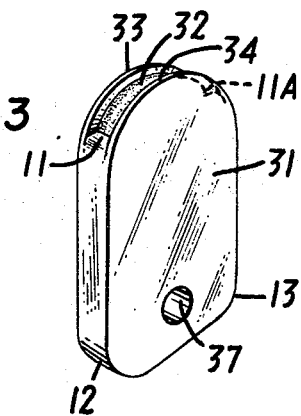
FIG. 3 is a perspective view of another embodiment of this invention.

When the unit is being used, it is held firmly in one hand between the index finger and the thumb; the other hand holding in place the slide fastener. The unit is then engaged with the slide fastener with the peripheral edge of the grooved housing in line with the longitudinal line of the slide fastener. As the unit is pressed onto and glided over the slide fastener, the latter is guided by the bevelled edges 5 and 6, of flanges 3 and 4 toward the lubricant 2, which thereby lubricates the slide fastener. In FIG. 3 there is shown another embodiment in which the main body 31 is roughly shaped like a rectangle, with the upper edge curved like an arc of a circle. The upper rounded portion contains a groove which is flanked by flanges 33 and 34 with terminal points 11 and 11A and in which the solid lubricant 32 is embedded. Corners 12 and 13 are rounded. A hole 37 near the base edge allows the unit to be hung on a nail or carried on a key chain. A cross section through the arcuate portion of the housing and lubricant of this unit would be congruous to the cross section of the housing and lubricant of the unit shown in FIG. 2.

Figure 4:
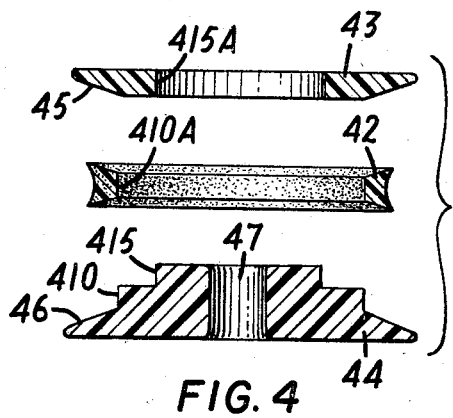
FIG. 4 is an exploded cross sectional view of another embodiment of this invention.
Figure 5:
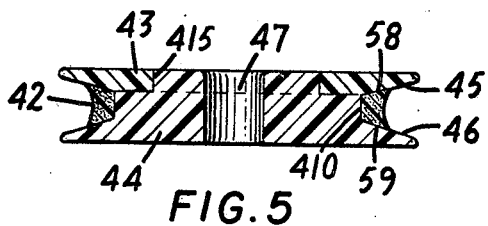
FIG. 5 is a sectional view showing the three parts of FIG. 4 assembled.

Another embodiment of the invention is illustrated in FIG. 4, in which a lubricating ring 42, and two housing parts 43 and 44 are shown before assembly in consecutive order. When the three units are assembled (FIG. 5) inner edge 410A of lubricating ring 42 slips onto outer edge 410 of housing part 44; and inner edge 415A of housing part 43 slips onto outer edge 415 of housing part 44. The two housing parts 43 and 44 are then secured together with the lubricating ring 42 between them. This then forms a unit, a sectional view of which is shown in FIG. 5, which when compared to the sectional view of the unit in FIG. 2 would be congruous.

Figure 6:
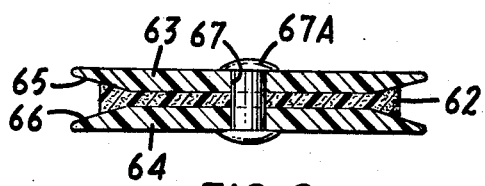
FIG. 6 is a section view of another embodiment of this invention.

FIG. 6 shows an assembled unit consisting of two circular discs 63 and 64, with center rivet holes 67, and internal peripheral surfaces 65 and 66, bevelled for guiding the slide fastener toward lubricant 62. These washer shaped discs may be made of plastic or other suitable material. The lubricant 62 is represented by a circular disc-shaped material, of, or similar to, felt or other suitable material, which is saturated with a solid lubricant, for example paraffin especially at the peripheral edge, so that the slide fastener can partake of the lubricant. The rivet hole 67 is located in the center of the lubricating disc. The diameter of the lubricating disc is smaller than the diameters of flanges 65 and 66, to allow for the guiding action of bevelled edges 65 and 66. When the two lateral flanges 63 and 64, and the center lubricating disc 62 are concentrically aligned, a rivet 67A is inserted into rivet holes 67, and the edges of the rivet peened over, thus forming a completed unit.

While preferred embodiments of the invention have been illustrated and particularly described, it will be understood that the invention is not limited to these embodiments and that modifications may be made without departing from the invention as defined by the following claims.

What I claim is:
1. A hand held lubricator for lubricating a slide fastener comprising a row of fastener elements secured to a fabric edge, said lubricator comprising opposed disc portions having curved peripheral flanges with peripheral edges and inner guide surfaces spaced apart a distance to receive a row of fastener elements between them, a body of solid wax-type lubricant fixedly held between said disc portions with a curved peripheral surface positioned between said guide surfaces of said flanges and spaced inwardly from said peripheral edges, said guide surfaces converging smoothly inwardly from said peripheral edges to guide said fastener elements inwardly to said peripheral surface of said solid lubricant while keeping out of contact with said lubricant adjacent portions of fabric to which said fastener elements are secured, and connecting means extending between said disc portions and through said interposed solid lubricant to secure said disc portions together and to secure said solid lubricant fixedly between them, said lubricator being slidable along said slide fasteners to abrade portions of said solid lubricant onto said fastener elements while slowly turning said lubricator to bring different portions of said curved peripheral surface of said solid lubricant into engagement with said slide fastener.

2. A slide fastener lubricator according to claim 1, in which said disc portions are generally circular with said peripheral flanges extending circumferentially of said disc portions.

3. A slide fastener lubricator according to claim 2, in which said connecting means comprises a central portion integral with at least one of said disc portions and of smaller diameter than said peripheral flanges, said central portion and said flanges defining an annular groove, and in which said solid lubricant is in the form of a ring fixedly held in said annular groove.

4. A slide fastener lubricator according to claim 3, in which said central portion is integral with one of said disc portions and has a portion interfitting with the other said disc portion to secure said disc portions together.

5. A slide fastener lubricator according to claim 3, in which said disc portions and central portion have a central hole extending therethrough.

6. A slide fastener lubricator according to claim 2, in which said solid lubricant is in the form of a circular disc sandwiched between said disc portions and said connecting means comprises a connecting member extending through said disc portions and interposed solid lubricant.

7. A slide fastener lubricator according to claim 1, in which said guide surfaces of said peripheral flanges are bevelled at an angle to one another.

8. A slide fastener lubricator according to claim 1, in which said solid lubricant is paraffin wax.

References Cited

UNITED STATES PATENTS

| 905,756 | 12/1908 | Skinner. | |
|---|---|---|---|
| 1,670,696 | 5/1928 | Stuhr. | |
| 2,158,721 | 5/1939 | Jackson | 184—152 |
| 2,713,694 | 7/1955 | Soldan. | |
| 3,019,471 | 2/1962 | Bowersox | 184—15 |
| 3,058,144 | 10/1962 | Schotsch | 184—16 |

FOREIGN PATENTS 240,066  10/1911  Germany.

LAVERNE D. GEIGER, Primary Examiner

E. J. EARLS, Assistant Examiner

U.S. Cl. X.R.

118—76; 184—14; 401—88, 193;